J. B. DAGUE.
Evaporating Pan.
No. 25,813.  Patented Oct. 18, 1859.
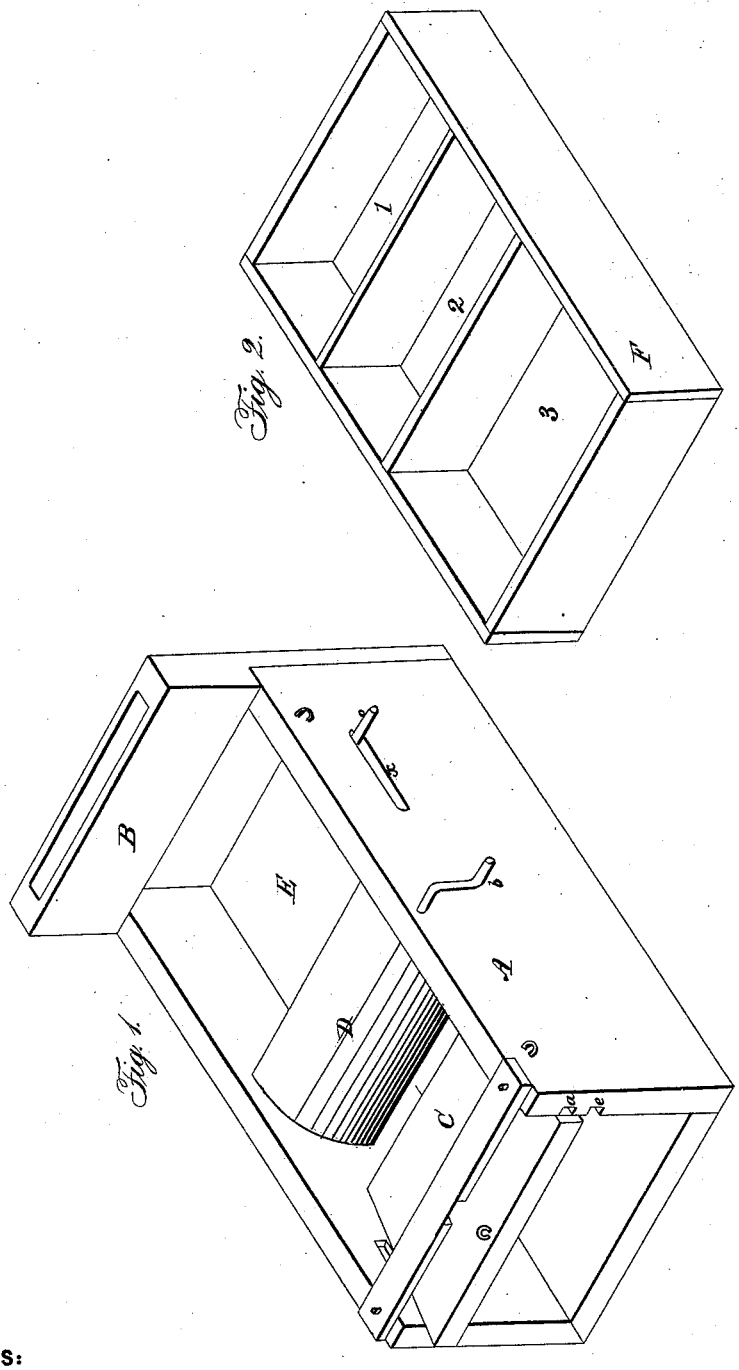
Witnesses:
W. Edson
Marcus Phillips.
Inventor:
J. B. Dague

UNITED STATES PATENT OFFICE.

J. B. DAGNE, OF ASHLEY, OHIO.

IMPROVEMENT IN CONSTRUCTION OF EVAPORATING APPARATUS.

Specification forming part of Letters Patent No. 25,813, dated October 18, 1859.

*To all whom it may concern:*

Be it known that I, J. B. DAGNE, of Ashley, in the county of Delaware and State of Ohio, have invented certain new and useful Improvements in Construction of Apparatus for Evaporaing Sugar; and I do hereby declare that the following is a full, clear, and exact description of the same, reference being had to the accompanying drawings and the letters of reference marked thereon.

The nature of my invention consists in the employment over a furnace of a pan which is provided with two or more compartments, when the same is used in connection with certain slides and a damper, which are to be arranged substantially in the manner hereinafter described.

To enable others skilled in the art to make and use my invention, I will now describe its construction and operation.

Figure 1 is a perspective view of the fire-chamber and flue. Fig. 2 is also a perspective of the pan.

In Fig. 1, A represents the fire-chamber, which may be constructed of stone or brick or any other material not easily affected by heat. B is the flue, which is located at the end of the fire-chamber A, as shown in Fig. 1. C is a slide, which enters the parallel grooves on the inner sides of fire-chamber. D is a damper, which is pivoted between the sides of the fire-chamber, and is operated by means of the crank $b$. E is a slide, under one side of which is a piece of iron secured to fire-chamber for said slide to rest upon, while in the center of the other side of said slide is a pin which rests in the groove $x$, as fully shown in Fig. 1. Said groove $x$ is of sufficient length to allow slide E to be pushed back and close the flue when necessary.

F, Fig. 2, represents the pan, which is placed on top of fire-chamber A. Said pan is divided into three compartments, each one of which being of the dimensions of the slides and damper over which they are placed.

The operation of my machine is as follows: All the compartments of the pan being filled with fresh sap, a hot fire is applied and the sap is boiled quite rapidly for some time. Then, supposing the slide C to be in the groove $a$, hanging in a vertical position, answering in place of a door, through or under the lower part of which the air passes, thereby creating a draft, then by shoving pin $o$ back toward the flue the heat strikes the whole bottom of the pan. Then, to cool compartments 2 and 3, turn the slides C in an almost horizontal position and run it back to a notch for its reception in the back part of the groove $a$, and to cool the remaining compartment draw the slide E forward by means of the pin $o$, and turn damper D by means of the crank $b$, so that the edge of damper D shall touch the side of slide E on its upper surface.

Having thus fully described my invention, what I claim as new, and desire to secure by Letters Patent, is—

The employment of the pan F, which is provided with two or more compartments, and situated over a furnace, when said pan is used in connection with the slides E and C and damper D, the whole being combined and arranged substantially in the manner herein set forth, for the purpose of forming a sugar-evaporator, as is described.

J. B. DAGNE.

Witnesses:
W. EDSON,
MARCUS PHILLIPS.